US012802633B2

(12) United States Patent
Kim et al.

(10) Patent No.: US 12,802,633 B2
(45) Date of Patent: Nov. 17, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Jinseuk Kim, Yongin-si (KR); Taesoo Kang, Yongin-si (KR); Jong Heon Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/240,358

(22) Filed: Jun. 17, 2025

(65) Prior Publication Data

US 2026/0065851 A1 Mar. 5, 2026

(30) Foreign Application Priority Data

Aug. 30, 2024 (KR) ........................ 10-2024-0117652

(51) Int. Cl.

*G06F 11/22* (2006.01)
*G06F 3/01* (2006.01)
*G06F 11/27* (2006.01)
*G09G 3/3208* (2016.01)

(52) U.S. Cl.

CPC ....... *G09G 3/3208* (2013.01); *G06F 11/2221* (2013.01); *G06F 11/27* (2013.01); *G06F 3/011* (2013.01); *G06F 11/2273* (2013.01); *G09G 2310/0216* (2013.01);

(Continued)

(58) Field of Classification Search

CPC .. G06F 3/011; G06F 11/2221; G06F 11/2273; G06F 11/27; G09G 3/3208; G09G 2310/0216; G09G 2310/061; G09G 2320/041; G09G 2320/0626; G09G 2330/10

See application file for complete search history.

(56) References Cited

U.S. PATENT DOCUMENTS

| | | | | |
|---|---|---|---|---|
| 11,663,975 B2 * | 5/2023 | Moradi | ................ | G09G 3/3233 345/55 |
| 2022/0157243 A1 * | 5/2022 | Baek | .................... | G09G 3/3233 |
| 2024/0212584 A1 * | 6/2024 | Kim | ......................... | G09G 3/32 |

FOREIGN PATENT DOCUMENTS

KR 10-2021-0058232 A 5/2021

* cited by examiner

*Primary Examiner* — Julie Anne Watko

(74) *Attorney, Agent, or Firm* — F. Chau & Associates, LLC

(57) ABSTRACT

A display device includes a display panel including a pixel including a driving transistor, a compensation transistor connected to a gate electrode of the driving transistor and a first electrode of the driving transistor, an initialization transistor connected to a first electrode of the compensation transistor, and a light-emitting element configured to emit a light based on an initialization voltage applied through the compensation transistor and the initialization transistor and a low power supply voltage. The display device further includes an initialization voltage generator configured to generate the initialization voltage, a current sensor configured to sense a sensing current flowing through the compensation transistor and the initialization transistor to generate sensing data, and a driving controller configured to calculate a threshold voltage of the compensation transistor and a threshold voltage of the initialization transistor, independently, based on the sensing data to compensate for input image data.

20 Claims, 8 Drawing Sheets

(52) U.S. Cl.
CPC . *G09G 2310/061* (2013.01); *G09G 2320/041* (2013.01); *G09G 2320/0626* (2013.01); *G09G 2330/10* (2013.01)

DISPLAY DEVICE AND ELECTRONIC DEVICE INCLUDING THE SAME

CROSS-REFERENCE TO RELATED APPLICATIONS

This application claims priority under 35 U.S.C. § 119 to Korean Patent Application No. 10-2024-0117652, filed on Aug. 30, 2024, the disclosure of which is incorporated by reference herein in its entirety.

TECHNICAL FIELD

Embodiments of the present inventive concept relate to a display device and an electronic device including the same, in which the display device provides improved display quality

DISCUSSION OF RELATED ART

In general, a display device includes a display panel and a display panel driver. The display panel may include a plurality of gate lines, a plurality of data lines, a plurality of emission lines, and a plurality of pixels. The display panel driver may include a gate driver that provides a gate signal to the gate lines, a data driver that provides a data voltage to the data lines, an emission driver that provides an emission signal to the emission lines, and a driving controller that controls the gate driver, the data driver, and the emission driver. Each of the pixels may include a driving transistor, a data write transistor, a compensation transistor, an initialization transistor, etc.

SUMMARY

Embodiments of the present inventive concept provide a display device that compensates a threshold voltage shift of a compensation transistor and a threshold voltage shift of an initialization transistor, which may reduce a luminance deviation.

Embodiments of the present inventive concept provide an electronic device including the display device.

According to an embodiment of the present inventive concept, a display device includes a display panel including a pixel including a driving transistor, a compensation transistor connected to a gate electrode of the driving transistor and a first electrode of the driving transistor, an initialization transistor connected to a first electrode of the compensation transistor, and a light-emitting element configured to emit a light based on an initialization voltage applied through the compensation transistor and the initialization transistor and a low power supply voltage. The display device further includes an initialization voltage generator configured to generate the initialization voltage, a current sensor configured to sense a sensing current flowing through the compensation transistor and the initialization transistor to generate sensing data, and a driving controller configured to calculate a threshold voltage of the compensation transistor and a threshold voltage of the initialization transistor, independently, based on the sensing data to compensate for input image data.

In an embodiment, the compensation transistor and the initialization transistor are n-type metal-oxide (NMOS) transistors.

In an embodiment, the initialization voltage is greater than the low power supply voltage.

In an embodiment, the driving transistor includes the gate electrode connected to a first node, the first electrode connected to a second node, and a second electrode connected to a third node. The compensation transistor includes a gate electrode that receives a compensation gate signal, a first electrode connected to the first node, and a second electrode connected to the second node. The initialization transistor includes a gate electrode that receives an initialization gate signal, a first electrode connected to a sensing node, and a second electrode connected to the first node. The light-emitting element includes an anode electrically connected to the second node and a cathode that receives the low power supply voltage.

In an embodiment, the initialization voltage generator is configured to output the initialization voltage to the sensing node, and the current sensor is configured to sense the sensing current flowing in an initialization line including the sensing node to generate the sensing data.

In an embodiment, the driving controller is configured to calculate a voltage of the first node or a voltage of the sensing node based on the sensing data.

In an embodiment, the compensation transistor is turned on when a difference between a level of the compensation gate signal and a voltage of the first node is greater than or about equal to the threshold voltage of the compensation transistor, and the initialization transistor is turned on when a difference between a level of the initialization gate signal and a voltage of the sensing node is greater than or about equal to the threshold voltage of the initialization transistor.

In an embodiment, the initialization voltage is applied to the light-emitting element, and the light-emitting element is configured to emit the light based on the initialization voltage and the low power supply voltage when the compensation transistor and the initialization transistor are turned on.

In an embodiment, the compensation transistor is turned off when a difference between a level of the compensation gate signal and a voltage of the first node is less than the threshold voltage of the compensation transistor, and the initialization transistor is turned off when a difference between a level of the initialization gate signal and a voltage of the sensing node is less than the threshold voltage of the initialization transistor.

In an embodiment, a difference between a level of the compensation gate signal at a moment when the light-emitting element starts to emit the light and a voltage of the first node is the threshold voltage of the compensation transistor when the initialization transistor maintains a turn-on state and the level of the compensation gate signal applied to the gate electrode of the compensation transistor increases.

In an embodiment, a difference between a level of the initialization gate signal at a moment when the light-emitting element starts to emit the light and a voltage of the sensing node is the threshold voltage of the initialization transistor when the compensation transistor maintains a turn-on state and the level of the initialization gate signal applied to the gate electrode of the initialization transistor increases.

In an embodiment, the pixel further includes a data write transistor including a gate electrode that receives a data write gate signal, a first electrode that receives a data voltage, and a second electrode connected to the third node, an anode initialization transistor including a gate electrode that receives a bias gate signal, a first electrode that receives an anode initialization voltage, and a second electrode connected to the anode of the light-emitting element, and a storage capacitor including a first electrode receiving a high power supply voltage and a second electrode connected to the first node.

In an embodiment, the high power supply voltage and the low power supply voltage may be maintained to be about equal to each other.

In an embodiment, the pixel further includes a first light-emitting control transistor including a gate electrode that receives an emission signal, a first electrode that receives the high power supply voltage, and a second electrode connected to the third node, and a second light-emitting control transistor including a gate electrode that receives the emission signal, a first electrode connected to the second node, and a second electrode connected to a fourth node. The anode of the light-emitting element is connected to the fourth node.

In an embodiment, the pixel further includes a bias transistor including a gate electrode that receives the bias gate signal, a first electrode that receives a bias voltage, and a second electrode connected to the third node.

In an embodiment, the driving transistor, the data write transistor, and the anode initialization transistor maintain a turn-off state, and the first light-emitting control transistor and the second light-emitting control transistor maintain a turn-on state.

In an embodiment, the emission signal is a sequential signal sequentially applied to a plurality of pixel rows, and the driving controller sequentially receive the sensing data.

According to an embodiment of the present inventive concept, an electronic device includes a display panel including a pixel including a driving transistor, a compensation transistor connected to a gate electrode of the driving transistor and a first electrode of the driving transistor, an initialization transistor connected to a first electrode of the compensation transistor, and a light-emitting element configured to emit a light based on an initialization voltage applied through the compensation transistor and the initialization transistor and a low power supply voltage. The electronic device further includes an initialization voltage generator configured to generate the initialization voltage, a current sensor configured to sense a sensing current flowing through the compensation transistor and the initialization transistor to generate sensing data, a driving controller configured to calculate a threshold voltage of the compensation transistor and a threshold voltage of the initialization transistor, independently, based on the sensing data to compensate for input image data, and a processor configured to provide the input image data to the driving controller.

In an embodiment, the compensation transistor and the initialization transistor are n-type metal-oxide (NMOS) transistors.

In an embodiment, the initialization voltage is greater than the low power supply voltage.

According to an embodiment of the present inventive concept, an electronic device includes a processor, a memory having stored application programs for execution by the processor, and a display device. The display device includes a display panel including a pixel including a driving transistor, a compensation transistor connected to a gate electrode of the driving transistor and a first electrode of the driving transistor, an initialization transistor connected to a first electrode of the compensation transistor, and a light-emitting element configured to emit a light based on an initialization voltage applied through the compensation transistor and the initialization transistor and a low power supply voltage. The display device further includes an initialization voltage generator configured to generate the initialization voltage, a current sensor configured to sense a sensing current flowing through the compensation transistor and the initialization transistor to generate sensing data, and a driving controller configured to calculate a threshold voltage of the compensation transistor and a threshold voltage of the initialization transistor, independently, based on the sensing data to compensate for input image data. The electronic device further includes a user interface configured to sense user input via touch or cursor select of an icon presented on the display panel, wherein the processor is caused to execute one or more of the stored application programs upon receipt of the user input.

BRIEF DESCRIPTION OF THE DRAWINGS

The above and other features of the present inventive concept will become more apparent by describing in detail embodiments thereof with reference to the accompanying drawings, in which.

DETAILED DESCRIPTION OF THE EMBODIMENTS

Figure 1:
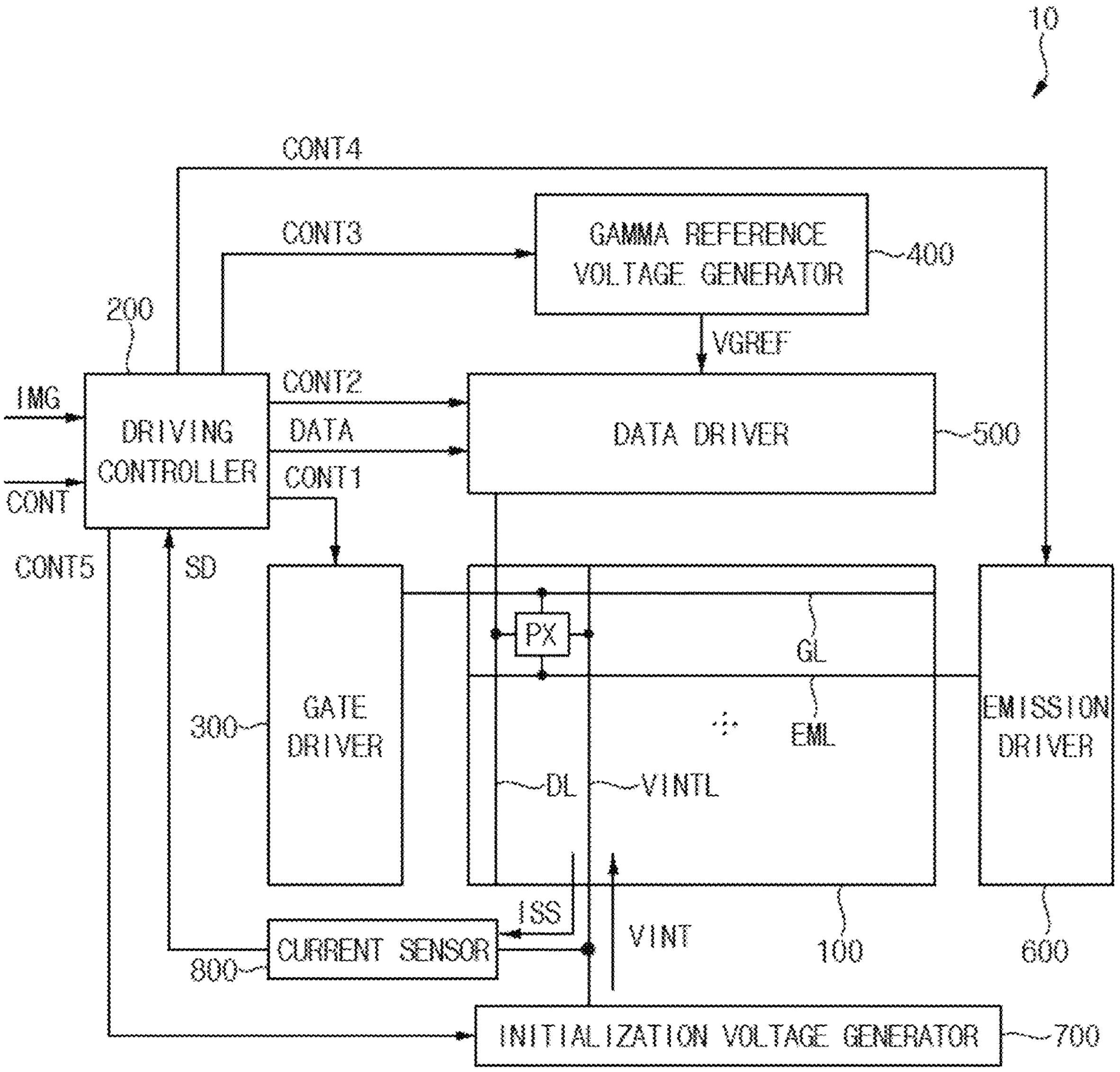
FIG. 1 is a block diagram showing a display device according to embodiments of the present inventive concept.

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art, for example, within ±30%, 20%, 10% or 5% of the stated value. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Embodiments of the present inventive concept relate to a display device that can improve image quality by compensating for variations in transistor characteristics within individual pixels. For example, according to embodiments, the display device includes a pixel structure having a driving transistor, a compensation transistor, an initialization transistor, and a light-emitting element. During a sensing mode, an initialization voltage is applied through the compensation and initialization transistors, and a sensing current is detected. This allows for the calculation of the threshold voltage of each transistor based on when the light-emitting element begins to emit light. The calculated threshold voltages are then used to compensate input image data, which may reduce luminance deviation that may result from threshold voltage shifts due to process variation.

To improve the accuracy of this compensation, the display device may be configured to calculate the threshold voltage of the compensation transistor and the threshold voltage of the initialization transistor independently. This may be achieved by holding one transistor in an ON state while varying the gate signal of the other, allowing each threshold voltage to be extracted without interference. By enabling precise per-transistor characterization and image data correction, the display device according to embodiments of the present inventive concept can maintain uniform brightness across the display panel, even in the presence of pixel-to-pixel variation introduced during manufacturing.

FIG. 1 is a block diagram showing a display device 10 according to embodiments of the present inventive concept.

Referring to FIG. 1, a display device 10 may include a display panel 100 and a display panel driver. The display panel driver may include a driving controller 200, a gate driver 300, a gamma reference voltage generator 400, a data driver 500, and an emission driver 600. The display panel driver may further include an initialization voltage generator 700 and a current sensor 800.

The display panel driver may also be referred to as a display panel driver circuit, the driving controller 200 may also be referred to as a driving controller circuit, the gate driver 300 may also be referred to as a gate driver circuit, the gamma reference voltage generator 400 may also be referred to as a gamma reference voltage generator circuit, the data driver 500 may also be referred to as a data driver circuit, the emission driver 600 may also be referred to as an emission driver circuit, the initialization voltage generator 700 may also be referred to as an initialization voltage generator circuit, and the current sensor 800 may also be referred to as a current sensor circuit.

The display panel 100 may include a display area in which an image is displayed and a peripheral area disposed adjacent to the display area.

For example, the display panel 100 may be an organic light-emitting diode display panel including an organic light-emitting diode. For example, the display panel 100 may be a quantum-dot organic light-emitting diode display panel including an organic light-emitting diode and a quantum-dot color filter. For example, the display panel 100 may be a quantum-dot nano light-emitting diode display panel including a nano light-emitting diode and a quantum-dot color filter.

The display panel 100 may include a plurality of pixels PX arranged in a matrix, and a plurality of gate lines GL, a plurality of data lines DL, a plurality of emission lines EML, and a plurality of initialization lines VINTL. The pixels PX may be electrically connected to the gate lines GL, the data lines DL, the emission lines EML, and the initialization lines VINTL. The gate lines GL may extend in a first direction, the data lines DL may extend in a second direction intersecting the first direction, the emission lines EML may extend in the first direction, and the initialization lines VINTL may extend in the second direction.

The driving controller 200 may receive input image data IMG and an input control signal CONT from an external processor. For example, in an embodiment, the input image data IMG may include red image data, green image data, and blue image data. In an embodiment, the input image data IMG may include white image data. In an embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA based on the input image data IMG and the input control signal CONT.

The driving controller 200 may generate the first control signal CONT1 that controls an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 that controls an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 that controls an operation of the gamma reference voltage generator 400 based on the input control signal CONT, and output the third control signal CONT3 to the gamma reference voltage generator 400.

The driving controller 200 may generate the fourth control signal CONT4 that controls an operation of the emission driver 600 based on the input control signal CONT, and output the fourth control signal CONT4 to the emission driver 600.

The driving controller 200 may generate the fifth control signal CONT5 that controls an operation of the initialization voltage generator 700 based on the input control signal CONT, and output the fifth control signal CONT5 to the initialization voltage generator 700.

The gate driver 300 may generate gate signals that drive the gate lines GL in response to the first control signal CONT1 received from the driving controller 200. The gate driver 300 may output the gate signals to the gate lines GL.

The gamma reference voltage generator 400 may generate a gamma reference voltage VGREF based on the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed within the driving controller 200 or within the data driver 500.

The data driver 500 may receive the second control signal CONT2 and the data signal DATA from the driving controller 200, and the gamma reference voltage VGREF from the gamma reference voltage generator 400. The data driver 500 may convert the data signal DATA into data voltages having an analog type. The data driver 500 may output the data voltages to the data lines DL.

The emission driver 600 may generate emission signals that drive the emission lines EML in response to the fourth control signal CONT4 received from the driving controller 200. The emission driver 600 may output the emission signals to the emission lines EML.

In FIG. 1, for convenience of explanation, the gate driver 300 is shown as being disposed on a first side of the display panel 100 and the emission driver 600 is shown as being disposed on a second side of the display panel 100. However, the present inventive concept is not limited thereto. For example, in an embodiment, the gate driver 300 and the emission driver 600 may both be disposed on the first side of the display panel 100. For example, in an embodiment, the gate driver 300 and the emission driver 600 may both be disposed on both sides of the display panel 100. For example, the gate driver 300 and the emission driver 600 may be formed integrally.

The initialization voltage generator 700 may generate an initialization voltage VINT in response to the fifth control signal CONT5 received from the driving controller 200 and output the initialization voltage VINT to the initialization lines VINTL.

The current sensor 800 may sense a sensing current ISS flowing through the initialization lines VINTL. The current sensor 800 may generate sensing data SD based on the sensing current ISS.

For example, the current sensor 800 may include an integrator and an analog-to-digital converter. The integrator may receive the sensing current ISS and convert the sensing current into a sensing voltage. The analog-to-digital converter may convert the sensing voltage having an analog type into the sensing data SD having a digital type.

When the display device 10 performs a sensing mode, the current sensor 800 may generate the sensing data SD. The sensing mode may be performed in a manufacturing process of the display device 10.

For example, the current sensor 800 may be disposed within the driving controller 200 or within the data driver 500.

Each of the pixels PX may include a driving transistor, a data write transistor, a compensation transistor, an initialization transistor, etc.

The driving controller 200 may calculate a threshold voltage of the compensation transistor and a threshold voltage of the initialization transistor based on the sensing data SD. The driving controller 200 may compensate the input image data IMG based on the calculated threshold voltage of the compensation transistor and the calculated threshold voltage of the initialization transistor to generate the data signal DATA.

For example, according to embodiments of the present inventive concept, the driving controller 200 may utilize the sensing data SD, which is generated based on the sensing current ISS flowing through the compensation transistor and the initialization transistor during a sensing mode, to accurately determine the respective threshold voltages of these transistors. By identifying how much the actual threshold voltages deviate from ideal or expected values (e.g., due to process variation), the driving controller 200 can compensate for such deviations by adjusting the input image data IMG accordingly. This compensation allows for each pixel PX to receive corrected data that accounts for its individual electrical characteristics. As a result, luminance deviation across the display panel may be reduced, and the overall uniformity and image quality of the display device may be improved.

Figure 2:
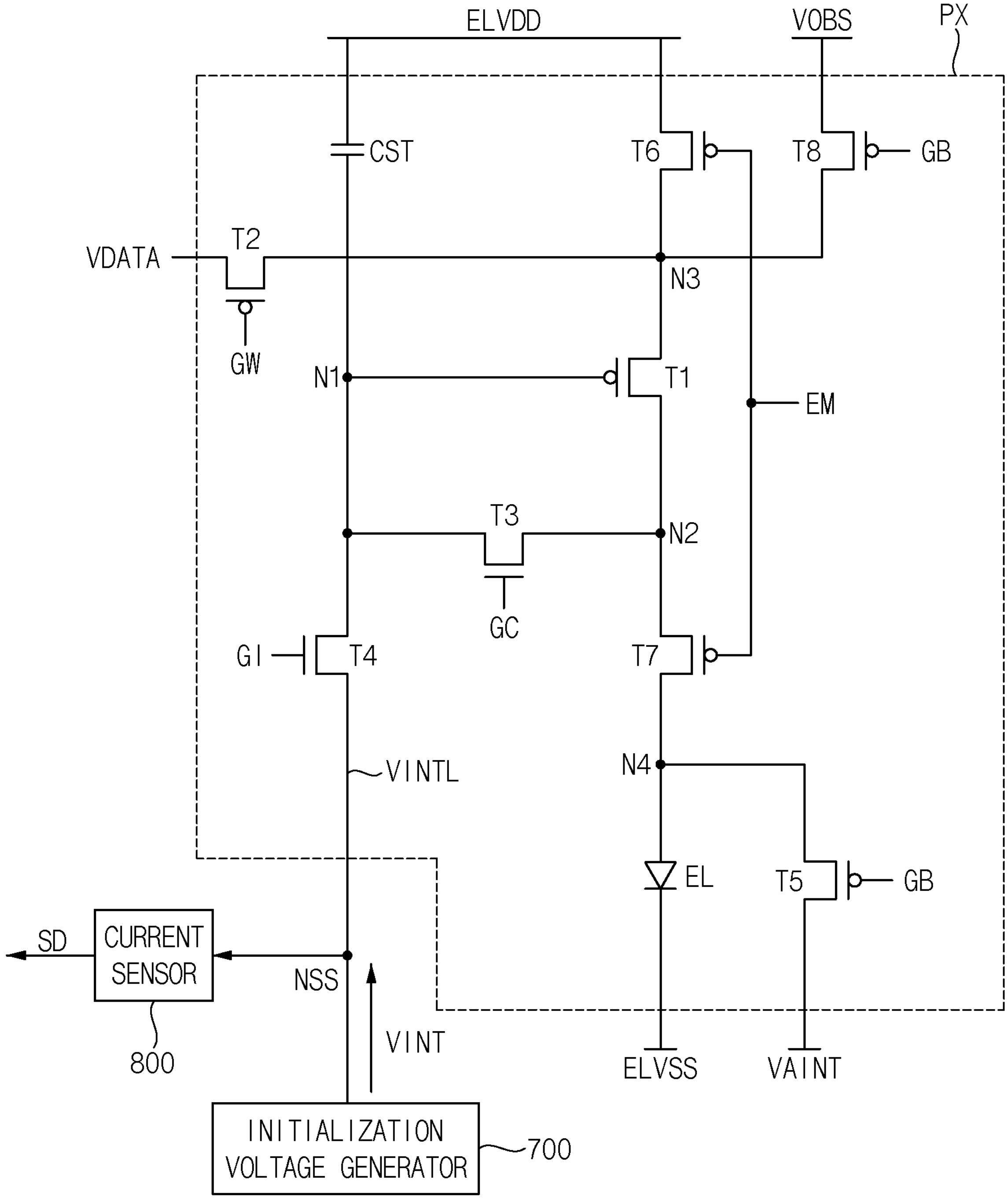
FIG. 2 is a diagram showing a pixel, an initialization voltage generator, and a current sensor of FIG. 1.
Figure 3:
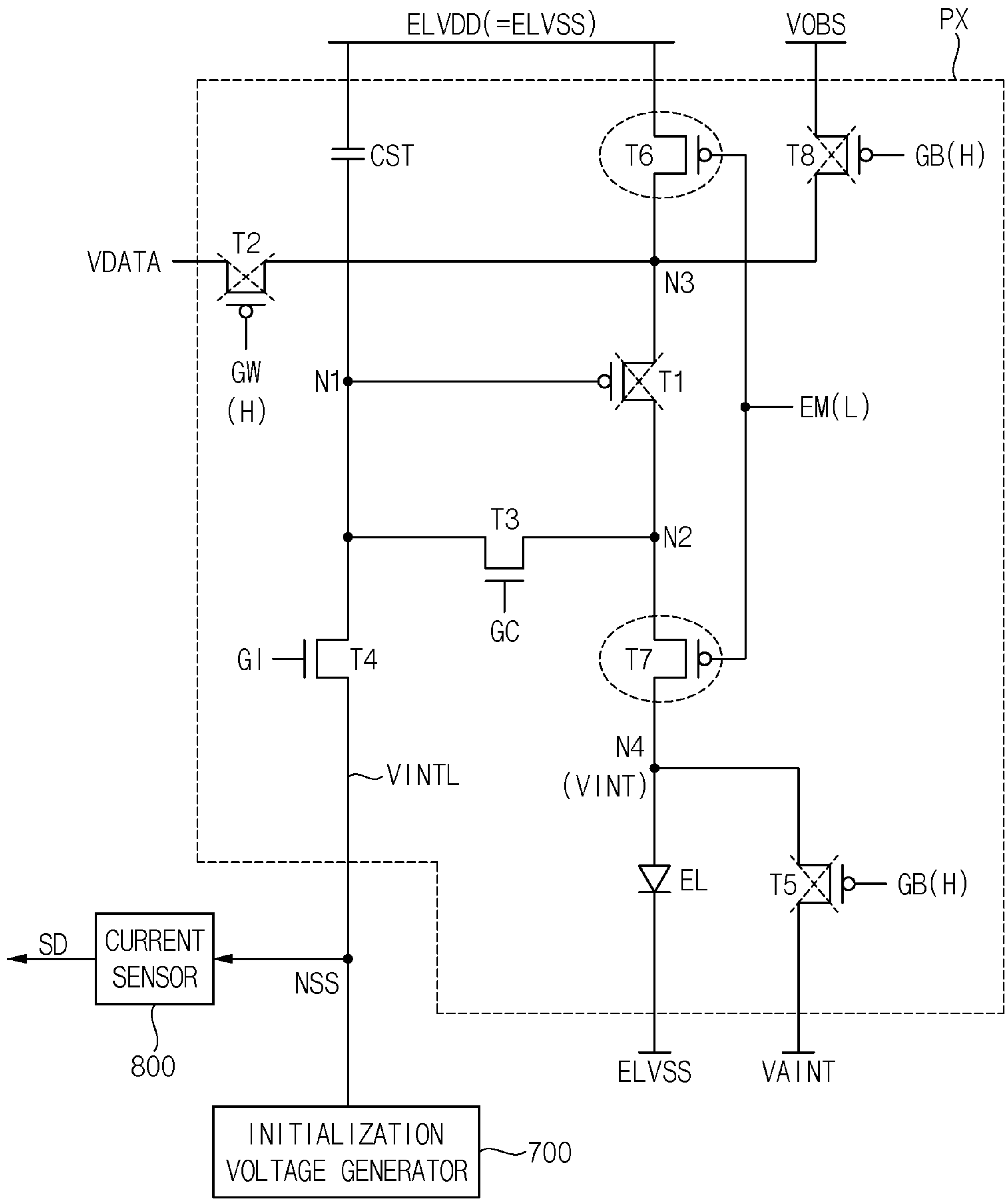
FIG. 3 is a diagram showing a state of transistors included in a pixel of FIG. 2 in a sensing mode.

FIG. 2 is a diagram showing a pixel PX, the initialization voltage generator 700, and the current sensor 800 of FIG. 1. FIG. 3 is a diagram showing a state of transistors included in the pixel PX of FIG. 2 in a sensing mode.

Referring to FIGS. 1 to 3, each of the pixels PX may include a first transistor T1, a second transistor T2, a third transistor T3, a fourth transistor T4, a fifth transistor T5, a sixth transistor T6, a seventh transistor T7, an eighth transistor T8, a storage capacitor CST, and a light-emitting element EL. The light-emitting element EL may be, for example, a light-emitting diode (LED) including, e.g., an organic light-emitting diode (OLED). The first transistor T1, the second transistor T2, the fifth transistor T5, the sixth transistor T6, the seventh transistor T7, and the eighth transistor T8 may be p-type metal-oxide semiconductor (PMOS) transistors, and the third transistor T3 and the fourth transistor T4 may be n-type metal-oxide semiconductor (NMOS) transistors.

The first transistor T1 may be referred to as a driving transistor. The second transistor T2 may be referred to as a data write transistor. The third transistor T3 may be referred to as a compensation transistor. The fourth transistor T4 may be referred to as an initialization transistor. The fifth transistor T5 may be referred to as an anode initialization transistor. The sixth transistor T6 may be referred to as a first light-emitting control transistor. The seventh transistor T7 may be referred to as a second light-emitting control transistor. The eighth transistor T8 may be referred to as a bias transistor.

The first transistor T1 may include a gate electrode connected to a first node N1, a first electrode connected to a second node N2, and a second electrode connected to a third node N3.

The second transistor T2 may include a gate electrode that receives a data write gate signal GW, a first electrode that receives the data voltage VDATA, and a second electrode connected to the third node N3.

The third transistor T3 may include a gate electrode that receives a compensation gate signal GC, a first electrode connected to the first node N1, and a second electrode connected to the second node N2.

The fourth transistor T4 may include a gate electrode that receives an initialization gate signal GI, a first electrode connected to a sensing node NSS, and a second electrode connected to the first node N1.

The fifth transistor T5 may include a gate electrode that receives a bias gate signal GB, a first electrode that receives an anode initialization voltage VAINT, and a second electrode connected to a fourth node N4.

The sixth transistor T6 may include a gate electrode that receives an emission signal EM, a first electrode that receives a high power supply voltage ELVDD, and a second electrode connected to the third node N3.

The seventh transistor T7 may include a gate electrode that receives the emission signal EM, a first electrode connected to the second node N2, and a second electrode connected to the fourth node N4.

The eighth transistor T8 may include a gate electrode that receives the bias gate signal GB, a first electrode that receives a bias voltage VOBS, and a second electrode connected to the third node N3.

The storage capacitor CST may include a first electrode that receives the high power supply voltage ELVDD and a second electrode connected to the first node N1.

The light-emitting element EL may include an anode connected to the fourth node N4 and a cathode that receives a low power supply voltage ELVSS.

The initialization voltage generator 700 may generate the initialization voltage VINT and output the initialization voltage VINT to the initialization line VINTL including the sensing node NSS.

A purpose of the sensing mode is to calculate the threshold voltage of the third transistor T3 and the threshold voltage of the fourth transistor T4. The purpose of the sensing mode may be achieved by applying the initialization voltage VINT to the anode of the light emitting element EL through the third transistor T3 and the fourth transistor T4, and sensing a sensing current ISS flowing through the third transistor T3 and the fourth transistor T4. For example, the current sensor 800 may sense the sensing current ISS flowing to the sensing node NSS.

For example, according to embodiments of the present inventive concept, to enable accurate compensation of threshold voltage variation, the sensing mode may be configured to determine the individual threshold voltages of the third transistor T3 (the compensation transistor) and the fourth transistor T4 (the initialization transistor) within each pixel PX. This may be accomplished by applying the initialization voltage VINT through the conduction path formed by T3 and T4 to the anode of the light-emitting element EL, and measuring the resulting sensing current ISS. The current sensor 800 may detect this current at the sensing node NSS, allowing embodiments to precisely monitor the moment when the light-emitting element begins to emit light. Because this emission event occurs when the combined gate-source voltages of T3 and T4 meet their respective threshold voltages, the sensed current may provide the necessary data for calculating those thresholds.

In general, the first transistor T1 may generate a driving current, and the light-emitting element EL may emit a light based on the driving current. To achieve the purpose of the sensing mode, the light-emitting element EL should not emit the light based on the driving current. Therefore, in the sensing mode, the second transistor T2 may maintain a turn-off state in response to a data write gate signal GW having a high level H, and the fifth transistor T5 and the eighth transistor T8 may maintain the turn-off state in response to a bias gate signal GB having the high level H. Since the initialization voltage VINT should be applied to the anode of the light-emitting element EL through the third transistor T3 and the fourth transistor T4, the sixth transistor T6 and the seventh transistor T7 may maintain a turn-on state in response to an emission signal EM having a low level L. The high power supply voltage ELVDD may be applied to the third node N3 through the sixth transistor T6. Since the first transistor T1 should not generate the driving current based on the high power supply voltage ELVDD, the high power supply voltage ELVDD and the low power supply voltage ELVSS may be maintained to be the same (e.g., are maintained to be about equal to each other).

Figure 4:
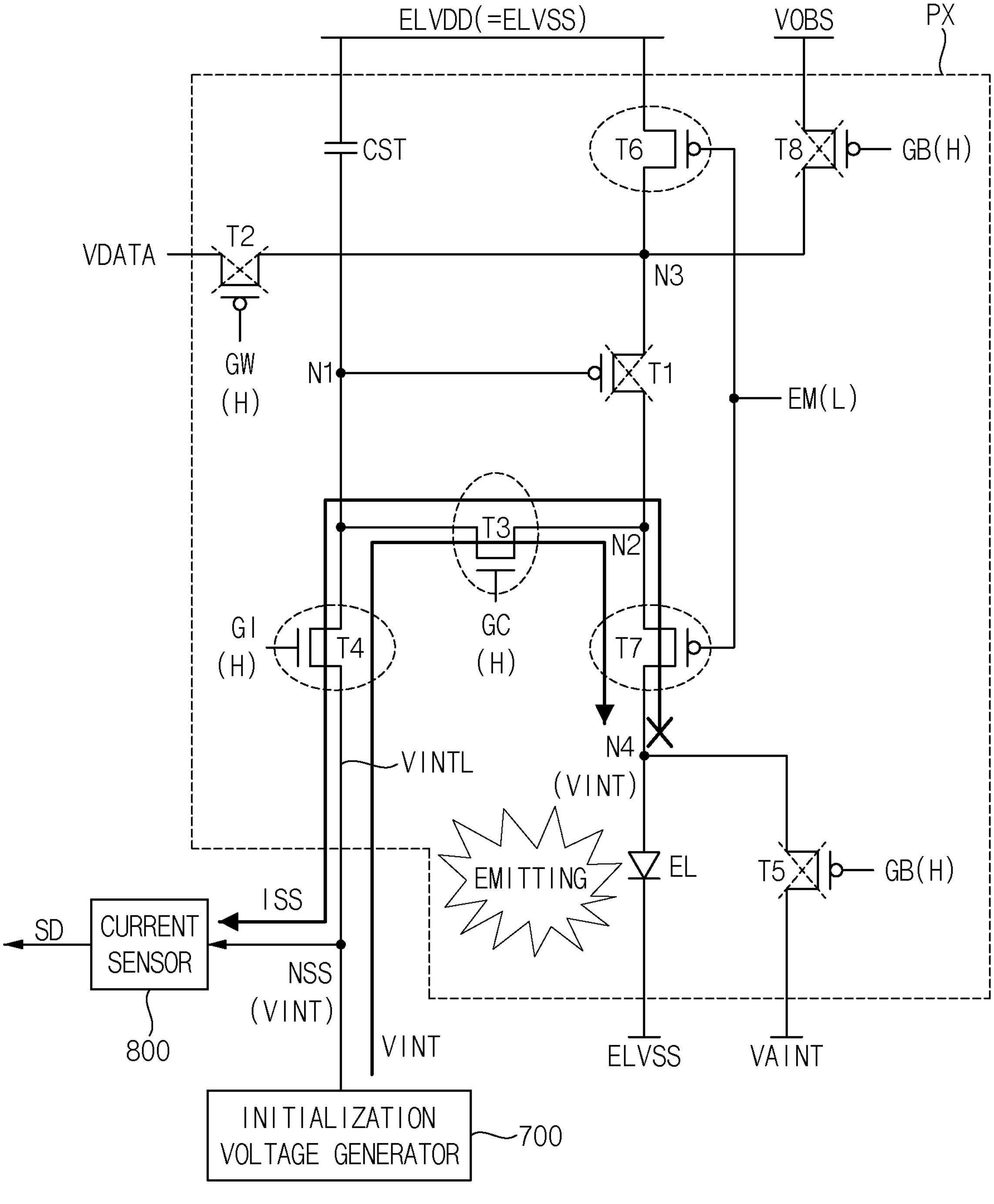
FIG. 4 is a conceptual diagram referenced in the explanation of a sensing mode.

FIG. 4 is a conceptual diagram referenced in the explanation of a sensing mode.

Referring to FIGS. 1 to 4, in an initial stage of the sensing mode, a level of the compensation gate signal GC and a level of the initialization gate signal GI may be low. A difference between the level of the compensation gate signal GC and the voltage of the first node N1 may be less than the threshold voltage of the third transistor T3, and the third transistor T3 may be turned off. The difference between the level of the initialization gate signal GI and a voltage of the sensing node NSS may be less than the threshold voltage of the fourth transistor T4, and the fourth transistor T4 may be turned off. Therefore, the initialization voltage VINT applied to the sensing node NSS through the initialization line VINTL may not be applied to the anode of the light-emitting element EL through the third transistor T3 and the fourth transistor T4. Therefore, the light-emitting element EL may not emit the light.

The level of the compensation gate signal GC and the level of the initialization gate signal GI may gradually increase. The difference between the level of the compensation gate signal GC and the voltage of the first node N1 may be greater than or equal to the threshold voltage of the third transistor T3, and the third transistor T3 may be turned on. The difference between the level of the initialization gate signal GI and the voltage of the sensing node NSS may be greater than or equal to the threshold voltage of the fourth transistor T4, and the fourth transistor T4 may be turned on. Therefore, the initialization voltage VINT applied to the sensing node NSS through the initialization line VINTL may be applied to the anode of the light-emitting element EL through the third transistor T3 and the fourth transistor T4. Accordingly, a voltage of the anode of the light-emitting element EL may be the initialization voltage VINT, a voltage of the cathode of the light-emitting element EL may be the low power supply voltage ELVSS, and the light-emitting element EL may emit the light based on the initialization voltage VINT and the low power supply voltage ELVSS.

Here, the difference between the level of the compensation gate signal GC and the voltage of the first node N1 may be a gate-source voltage of the third transistor T3, and the difference between the level of the initialization gate signal GI and the voltage of the sensing node NSS may be a gate-source voltage of the fourth transistor T4. When the light-emitting element EL emits the light, the gate-source voltage of the third transistor T3 may be about equal to the threshold voltage of the third transistor T3, and the gate-source voltage of the fourth transistor T4 may be about equal to the threshold voltage of the fourth transistor T4. Therefore, the current sensor 800 may generate the sensing data SD corresponding to the voltage of the first node N1 and the voltage of the sensing node NSS based on the sensing current ISS, and the driving controller 200 may calculate the voltage of the first node N1 and the voltage of the sensing node NSS based on the sensing data SD, and may calculate the threshold voltage of the third transistor T3 and the threshold voltage of the fourth transistor T4.

According to embodiments of the present inventive concept, the difference between the level of the compensation gate signal GC at a moment when the light-emitting element EL starts to emit the light and the voltage of the sensing node NSS may be the threshold voltage of the third transistor T3. In addition, the difference between the level of the initialization gate signal GI at a moment when the light-emitting element EL starts to emit the light and the voltage of the sensing node NSS may be the threshold voltage of the fourth transistor T4.

In general, the initialization voltage VINT may be used to initialize the anode of the light-emitting element EL, and for this purpose, the initialization voltage VINT may be about equal to the low power supply voltage ELVSS. However, in the sensing mode, since the initialization voltage VINT should be applied to the anode of the light-emitting element EL, and the light-emitting element EL should emit the light based on the initialization voltage VINT and the low power supply voltage ELVSS, the initialization voltage VINT may be set to be greater than the low power supply voltage ELVSS.

In addition, the emission signal EM may be a sequential signal sequentially applied to pixel rows. In this case, the seventh transistor T7 may be sequentially turned on for each pixel row. Therefore, the current sensor 800 may sequentially receive the sensing current ISS and sequentially generate the sensing data SD. Therefore, the driving controller 200 may sequentially receive the sensing data SD.

As shown in FIG. 4, when the level of the compensation gate signal GC and the level of the initialization gate signal GI are adjusted together, the threshold voltage of the third transistor T3 and the threshold voltage of the fourth transistor T4 may not be individually calculated. When the level of the compensation gate signal GC and the level of the initialization gate signal GI are adjusted together, a larger value among the threshold voltage of the third transistor T3 and the threshold voltage of the fourth transistor T4 may be regarded as the threshold voltage of both the third transistor T3 and the fourth transistor T4.

Figure 5:
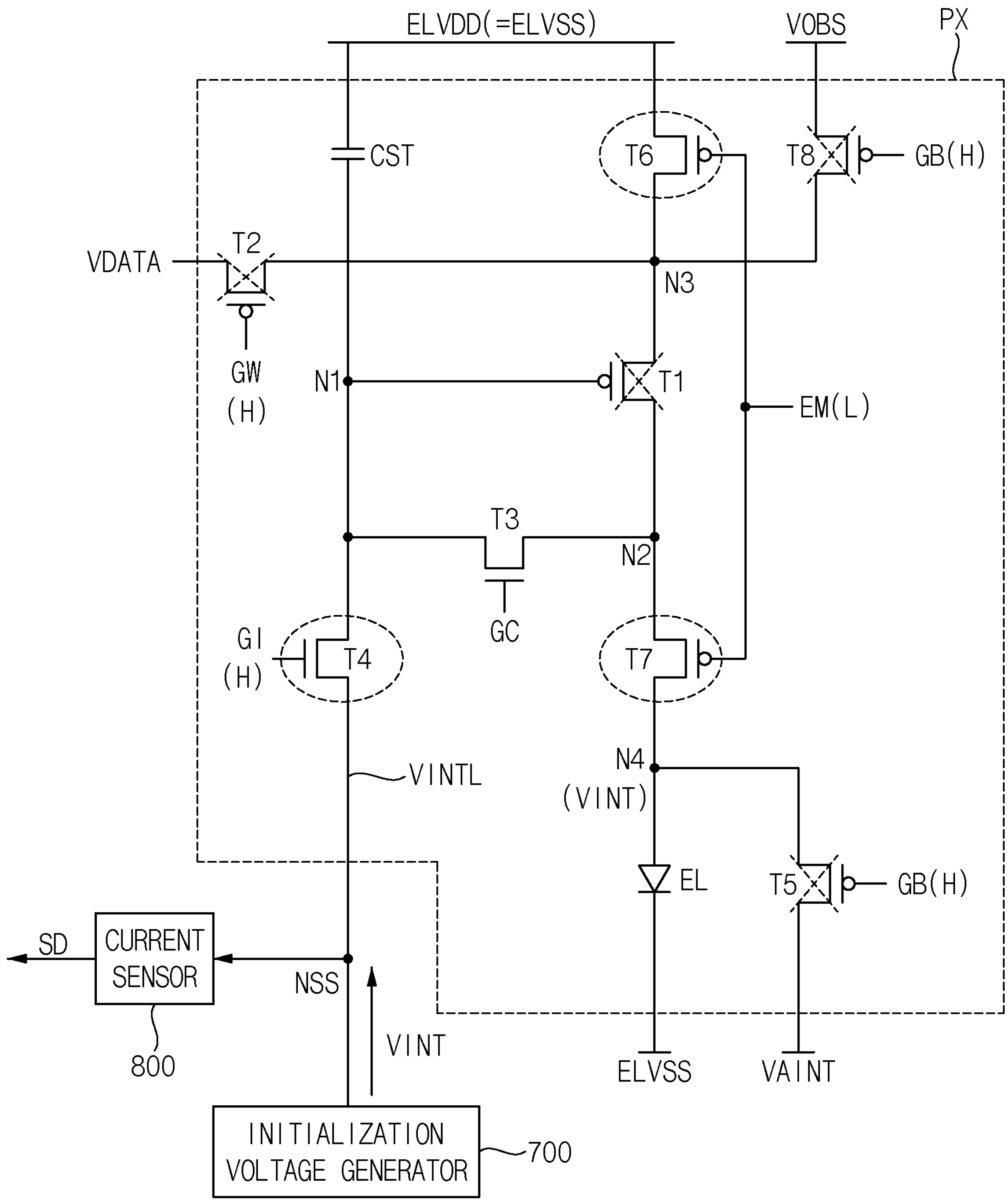
FIGS. 5 and 6 are diagrams referenced in the explanation of an operation of individually calculating a threshold voltage of a third transistor or a fourth transistor of FIG. 2 in a sensing mode.
Figure 6:
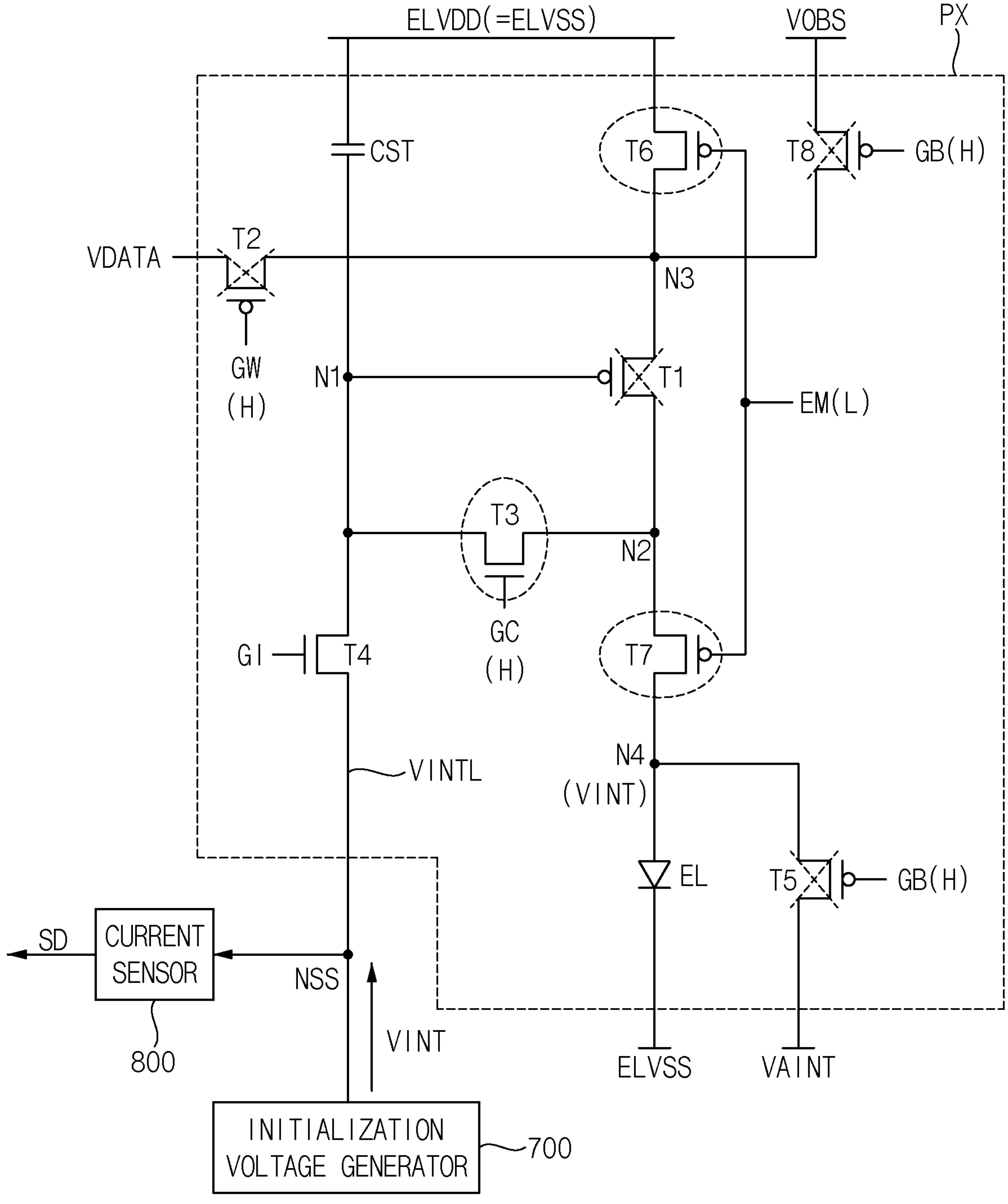

FIGS. 5 and 6 are diagrams referenced in the explanation of an operation of individually calculating a threshold voltage of a third transistor T3 or a fourth transistor T4 of FIG. 2 in a sensing mode.

Referring to FIGS. 1 to 6, as shown in FIG. 5, the third transistor T3 may not maintain the turn-on state, and only the fourth transistor T4 may maintain the turn-on state.

The level of the compensation gate signal GC may gradually increase. The difference between the level of the compensation gate signal GC and the voltage of the first node N1 may be greater than or about equal to the threshold voltage of the third transistor T3, and the third transistor T3 may be turned on. Therefore, the initialization voltage VINT applied to the sensing node NSS through the initialization line VINTL may be applied to the anode of the light-emitting element EL through the third transistor T3 and the fourth transistor T4. Therefore, the light-emitting element EL may emit the light based on the initialization voltage VINT and the low power supply voltage ELVSS.

Since the fourth transistor T4 always maintains the turn-on state, the driving controller 200 may calculate the threshold voltage of the third transistor T3 based on the sensing data SD.

Thereafter, as shown in FIG. 6, the fourth transistor T4 may not maintain the turn-on state, and only the third transistor T3 may maintain the turn-on state.

The level of the initialization gate signal GI may gradually increase. The difference between the level of the initialization gate signal GI and the voltage of the sensing node NSS may be greater than or about equal to the threshold voltage of the fourth transistor T4, and the fourth transistor T4 may be turned on. Therefore, the initialization voltage VINT applied to the sensing node NSS through the initialization line VINTL may be applied to the anode of the light-emitting element EL through the third transistor T3 and the fourth transistor T4. Therefore, the light-emitting element EL may emit the light based on the initialization voltage VINT and the low power supply voltage ELVSS.

Since the third transistor T3 always maintains the turn-on state, the driving controller 200 may calculate the threshold voltage of the fourth transistor T4 based on the sensing data SD.

As such, the threshold voltage of the third transistor T3 and the threshold voltage of the fourth transistor T4 may be calculated individually.

For example, according to embodiments of the present inventive concept, referring to FIG. 5, because the fourth transistor T4 remains in the turn-on state, the driving controller 200 may isolate the behavior of the third transistor T3 and calculate its threshold voltage based on the sensing data SD. Similarly, referring to FIG. 6, because the third transistor T3 remains in the turn-on state, the driving controller 200 may isolate the behavior of the fourth transistor T4 and calculate its threshold voltage based on the sensing data SD. By keeping one transistor continuously on while varying the gate signal of the other, the influence of each transistor can be independently evaluated. Accordingly, in embodiments of the present inventive concept, the display device may calculate the threshold voltage of the third transistor T3 and the threshold voltage of the fourth transistor T4 separately, which may enable accurate characterization of each transistor's electrical properties without cross-interference.

Thus, according to embodiments of the present inventive concept, the driving controller 200 may calculate the threshold voltage of the third transistor T3 (the compensation transistor) and the threshold voltage of the fourth transistor (the initialization transistor), independently, based on the sensing data SD, to compensate for input image data.

According to embodiments of the present inventive concept, the level of the compensation gate signal GC and the level of the initialization gate signal GI may be controlled, such that the third transistor T3 and the fourth transistor T4 may be turned on, the initialization voltage VINT may be applied to the anode of the light-emitting element EL through the third transistor T3 and the fourth transistor T4, and the light-emitting element EL may emit light. The threshold voltage of the third transistor T3 and the threshold voltage of the fourth transistor T4 may be calculated based on the sensing current ISS flowing through the third transistor T3 and the fourth transistor T4 at the moment when the light-emitting element EL starts to emit the light.

Figure 7:
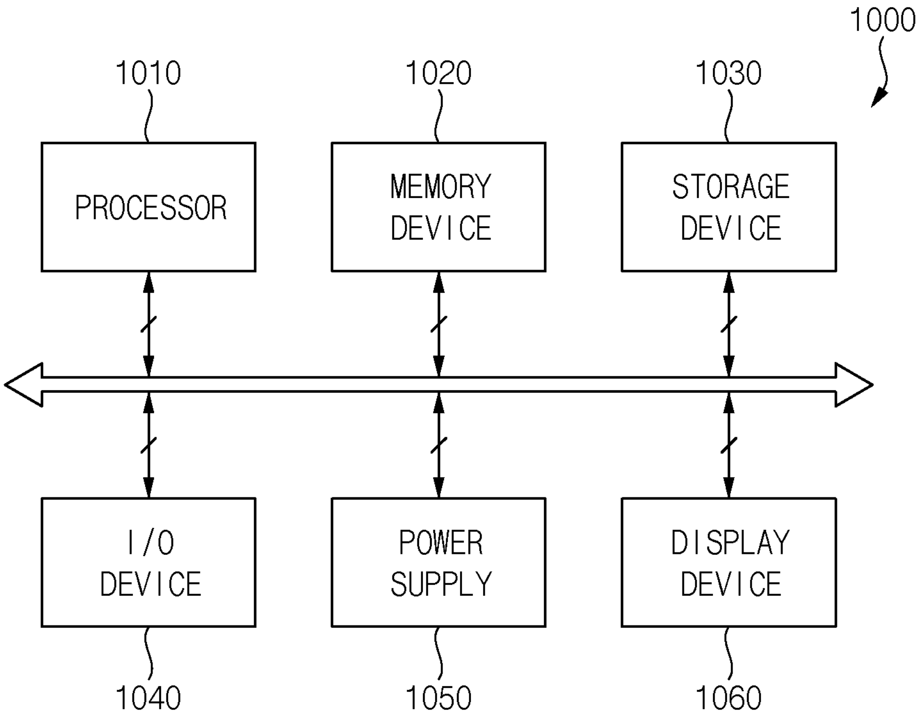
FIG. 7 is a block diagram showing an electronic device according to embodiments of the present inventive concept.
Figure 8:
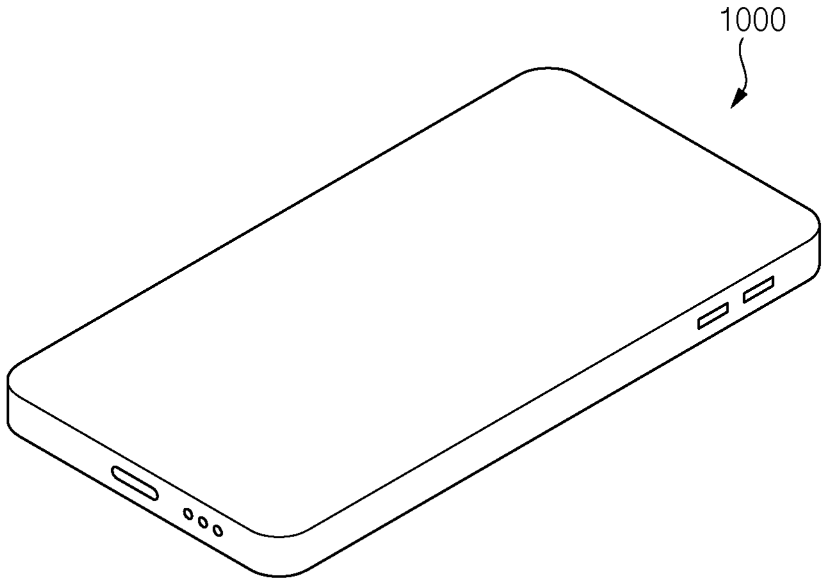
FIG. 8 is a diagram showing an embodiment in which the electronic device of FIG. 7 is implemented as a smartphone.

FIG. 7 is a block diagram showing an electronic device 1000 according to embodiments of the present inventive concept. FIG. 8 is a diagram showing an embodiment in which the electronic device 1000 of FIG. 7 is implemented as a smartphone.

Referring to FIGS. 7 and 8, an electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports used to communicate with, for example, a video card, a sound card, a memory card, a universal serial bus USB device, another electronic device, and the like.

In an embodiment, as illustrated in FIG. 8, the electronic device 1000 may be implemented as a smartphone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HND device, and the like.

The processor 1010 may perform various computing functions. The processor 1010 may be, for example, a micro processor, a central processing unit CPU, an application processor AP, and the like. The processor 1010 may be coupled to other components via, for example, an address bus, a control bus, a data bus, and the like. Further, the processor 1010 may be coupled to an extended bus such as, for example, a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include, for example, a solid state drive SSD device, a hard disk drive HDD device, a CD-ROM device, and the like.

The I/O device 1040 may include an input device such as, for example, a keyboard, a keypad, a mouse device, a touch-pad, a touch-screen, and the like, and an output device such as, for example, a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Embodiments of the present inventive concept may be applied to any display device and any electronic device including a touch panel. For example, embodiments of the present inventive concept may be applied to a mobile phone, a smartphone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

Figure 9:
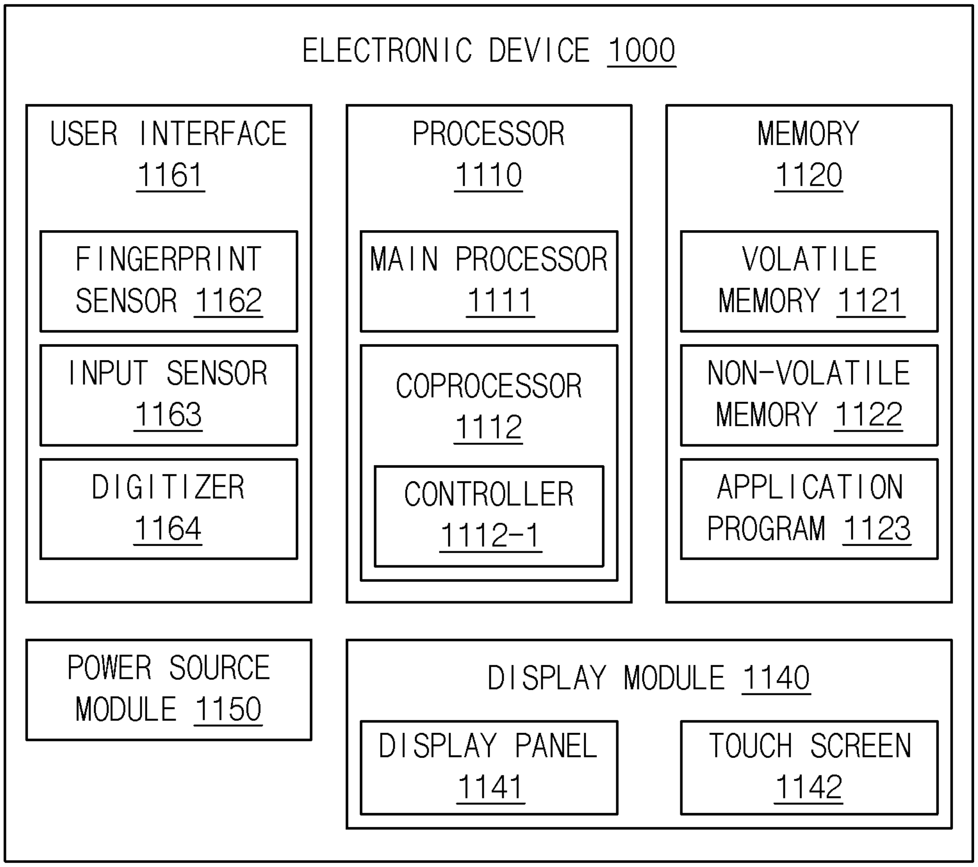
FIG. 9 is a diagram illustrating an electronic device according to an embodiment of the present inventive concept.

FIG. 9 is a diagram illustrating the electronic device 1000 according to an embodiment of the present inventive concept.

Referring to FIG. 9, in an embodiment of the present inventive concept, the electronic device 1000 may output various information (e.g., images, text, music, etc.) through a display module 1140, which, for example, may correspond to the display device 10 described above. When a processor 1110 executes an application stored in a memory 1120, the display module 1140 may provide application information to a user through a display panel 1141.

In some embodiments, the electronic device 1000 may be configured as, for example, a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as, for example, productivity tools, multimedia streaming and playback, file or mail deliveries or communication services. The application program 1123 interacts seamlessly with the user interface 1161 or touch screen 1142, allowing a user to launch, navigate, and utilize the program through user inputs such as, for example, touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

In an embodiment, when a user wishes to make a phone call, the user taps the telephone icon displayed on the display module 1140, and the processor 1110 may execute a phone application program stored in the memory 1120. A telephone keypad may be presented on the display panel 1141 for the user to enter a phone number to call.

In an embodiment, the display module 1140 may be integrated into an electronic device 1000, such as, for example, a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device 10 described above.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as, for example, blood pressure, moisture, or body mass.

The input sensor 1163 may sense user interactions including, for example, touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include, for example, a liquid crystal display panel, an organic light emitting display panel, or an inorganic light emitting display panel. However, the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display device 10 described above.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power to each of the components described above including the display module 1140.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Referring to a comparative example, transistors included in the pixels of a display device may have a difference in characteristics, such as a threshold voltage, due to, for example, process deviation, and a threshold voltage of the compensation transistor and a threshold voltage of the initialization transistor of a pixel may be shifted. In this case, the compensation transistor and the initialization transistor may not be sufficiently turned on, and a current flowing through the compensation transistor and a current flowing through the initialization transistor may be reduced. As a result, luminance deviation may occur in an image displayed on the display panel, and thus, display quality may be reduced. As described above, embodiments of the present application may address this issue by, for example, independently calculating the threshold voltage of the compensation transistor and the threshold voltage of the initialization transistor, based on sensing data, to compensate for input image data.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display device, comprising:

a display panel having a pixel including a driving transistor, a compensation transistor connected to a gate electrode of the driving transistor and a first electrode of the driving transistor, an initialization transistor connected to a first electrode of the compensation transistor, and a light-emitting element configured to emit light based on an initialization voltage applied through the compensation transistor and the initialization transistor and a low power supply voltage;

an initialization voltage generator configured to generate the initialization voltage;

a current sensor configured to sense a sensing current flowing through the compensation transistor and the initialization transistor to generate sensing data; and a driving controller configured to calculate a threshold voltage of the compensation transistor and a threshold voltage of the initialization transistor, independently, based on respective portions of the sensing data, to compensate input image data based on the calculated threshold voltages.

2. The display device of claim 1, wherein the compensation transistor and the initialization transistor are n-type metal-oxide semiconductor (NMOS) transistors, the calculated threshold voltage of the compensation transistor is based on a respective portion of the sensing data obtained when the gate voltage of the initialization transistor has a High level and the gate voltage of the compensation transistor is varied, and the calculated threshold voltage of the initialization transistor is based on a respective portion of the sensing data obtained when the gate voltage of the compensation transistor has a High level and the gate voltage of the initialization transistor is varied.

3. The display device of claim 1, wherein the initialization voltage is greater than the low power supply voltage.

4. The display device of claim 1, wherein the driving transistor includes the gate electrode connected to a first node, the first electrode connected to a second node, and a second electrode connected to a third node, the compensation transistor includes a gate electrode that receives a compensation gate signal, the first electrode connected to the first node, and a second electrode connected to the second node, the initialization transistor includes a gate electrode that receives an initialization gate signal, a first electrode connected to a sensing node, and a second electrode connected to the first node, and the light-emitting element includes an anode electrically connected to the second node and a cathode that receives the low power supply voltage.

5. The display device of claim 4, wherein the initialization voltage generator is configured to output the initialization voltage to the sensing node, and the current sensor is configured to sense the sensing current flowing in an initialization line including the sensing node to generate the sensing data.

6. The display device of claim 5, wherein the driving controller is configured to calculate a voltage of the first node or a voltage of the sensing node based on the sensing data.

7. The display device of claim 4, wherein the compensation transistor is turned on when a difference between a level of the compensation gate signal and a voltage of the first node is greater than or about equal to the threshold voltage of the compensation transistor, and the initialization transistor is turned on when a difference between a level of the initialization gate signal and a voltage of the sensing node is greater than or about equal to the threshold voltage of the initialization transistor.

8. The display device of claim 7, wherein the initialization voltage is applied to the light-emitting element, and the light-emitting element is configured to emit the light based on the initialization voltage and the low power supply voltage when the compensation transistor and the initialization transistor are turned on.

9. The display device of claim 4, wherein the compensation transistor is turned off when a difference between a level of the compensation gate signal and a voltage of the first node is less than the threshold voltage of the compensation transistor, and the initialization transistor is turned off when a difference between a level of the initialization gate signal and a voltage of the sensing node is less than the threshold voltage of the initialization transistor.

10. The display device of claim 4, wherein when the current sensor senses the sensing current flowing through the compensation transistor and the initialization transistor, a difference between a level of the compensation gate signal at a moment when the light-emitting element starts to emit the light and a voltage of the first node is the threshold voltage of the compensation transistor when the initialization transistor maintains a turn-on state and the level of the compensation gate signal applied to the gate electrode of the compensation transistor increases.

11. The display device of claim 4, wherein when the current sensor senses the sensing current flowing through the compensation transistor and the initialization transistor, a difference between a level of the initialization gate signal at a moment when the light-emitting element starts to emit the light and a voltage of the sensing node is the threshold voltage of the initialization transistor when the compensation transistor maintains a turn-on state and the level of the initialization gate signal applied to the gate electrode of the initialization transistor increases.

12. The display device of claim 4, wherein the pixel further includes:

a data write transistor including a gate electrode that receives a data write gate signal, a first electrode that receives a data voltage, and a second electrode connected to the third node;

an anode initialization transistor including a gate electrode that receives a bias gate signal, a first electrode that receives an anode initialization voltage, and a second electrode connected to the anode of the light-emitting element; and a storage capacitor including a first electrode that receives a high power supply voltage and a second electrode connected to the first node.

13. The display device of claim 12, wherein when the current sensor senses the sensing current flowing through the compensation transistor and the initialization transistor, the high power supply voltage and the low power supply voltage are maintained to be about equal to each other.

14. The display device of claim 12, wherein the pixel further includes:

a first light-emitting control transistor including a gate electrode that receives an emission signal, a first electrode that receives the high power supply voltage, and a second electrode connected to the third node; and a second light-emitting control transistor including a gate electrode that receives the emission signal, a first electrode connected to the second node, and a second electrode connected to a fourth node, wherein the anode of the light-emitting element is connected to the fourth node.

15. The display device of claim 14, wherein the pixel further includes:

a bias transistor including a gate electrode that receives the bias gate signal, a first electrode that receives a bias voltage, and a second electrode connected to the third node.

16. The display device of claim 14, wherein the driving transistor, the data write transistor, and the anode initialization transistor maintain a turn-off state, and the first light-emitting control transistor and the second light-emitting control transistor maintain a turn-on state.

17. The display device of claim 14, wherein the emission signal is a sequential signal sequentially applied to a plurality of pixel rows, and the driving controller sequentially receives the sensing data.

18. An electronic device, comprising:

a display panel having a pixel including a driving transistor, a compensation transistor connected to a gate electrode of the driving transistor and a first electrode of the driving transistor, an initialization transistor connected to a first electrode of the compensation transistor, and a light-emitting element configured to emit light based on an initialization voltage applied through the compensation transistor and the initialization transistor and a low power supply voltage;

an initialization voltage generator configured to generate the initialization voltage;

a current sensor configured to sense a sensing current flowing through the compensation transistor and the initialization transistor to generate sensing data;

a driving controller configured to calculate a threshold voltage of the compensation transistor and a threshold voltage of the initialization transistor, independently, based on respective portions of the sensing data, to compensate input image data based on the calculated threshold voltages; and a processor configured to provide the input image data to the driving controller.

19. The electronic device of claim 18, wherein the initialization voltage is greater than the low power supply voltage.

20. An electronic device, comprising:

a processor;

a memory having stored application programs for execution by the processor;

a display device, comprising:

a display panel having a pixel including a driving transistor, a compensation transistor connected to a gate electrode of the driving transistor and a first electrode of the driving transistor, an initialization transistor connected to a first electrode of the compensation transistor, and a light-emitting element configured to emit light based on an initialization voltage applied through the compensation transistor and the initialization transistor and a low power supply voltage;

an initialization voltage generator configured to generate the initialization voltage;

a current sensor configured to sense a sensing current flowing through the compensation transistor and the initialization transistor to generate sensing data; and a driving controller configured to calculate a threshold voltage of the compensation transistor and a threshold voltage of the initialization transistor, independently, based on respective portions of the sensing data, to compensate input image data based on the calculated threshold voltages; and a user interface configured to sense user input via touch or cursor selection of an icon presented on the display panel, wherein the processor is caused to execute one or more of the stored application programs upon receipt of the user input.

* * * * *